P. HALLOT.
SPEED CHANGE GEAR FOR MOTOR CARS AND OTHER PRACTICAL PURPOSES.
APPLICATION FILED MAR. 23, 1914.
1,189,100.
Patented June 27, 1916.
10 SHEETS—SHEET 3.
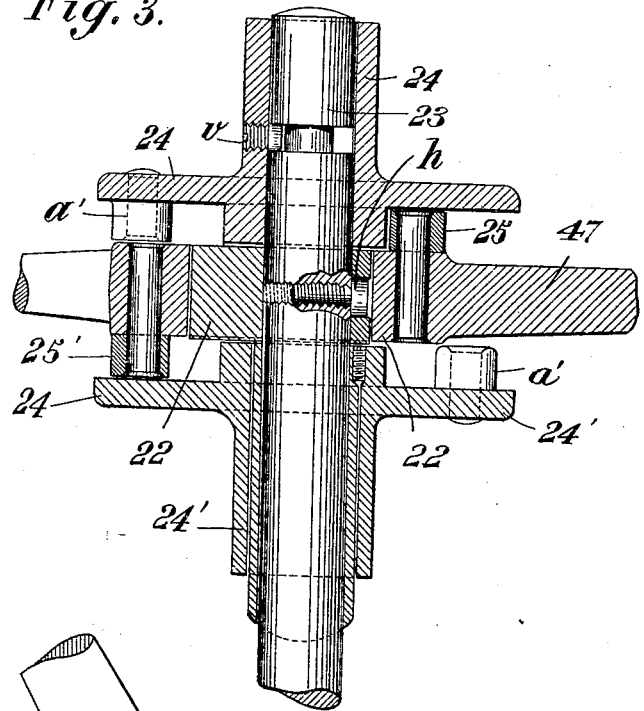
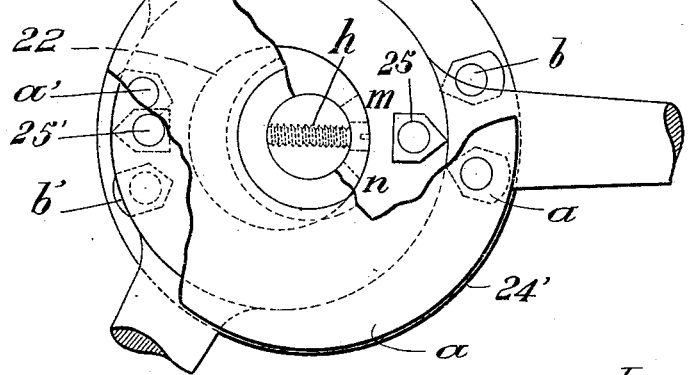

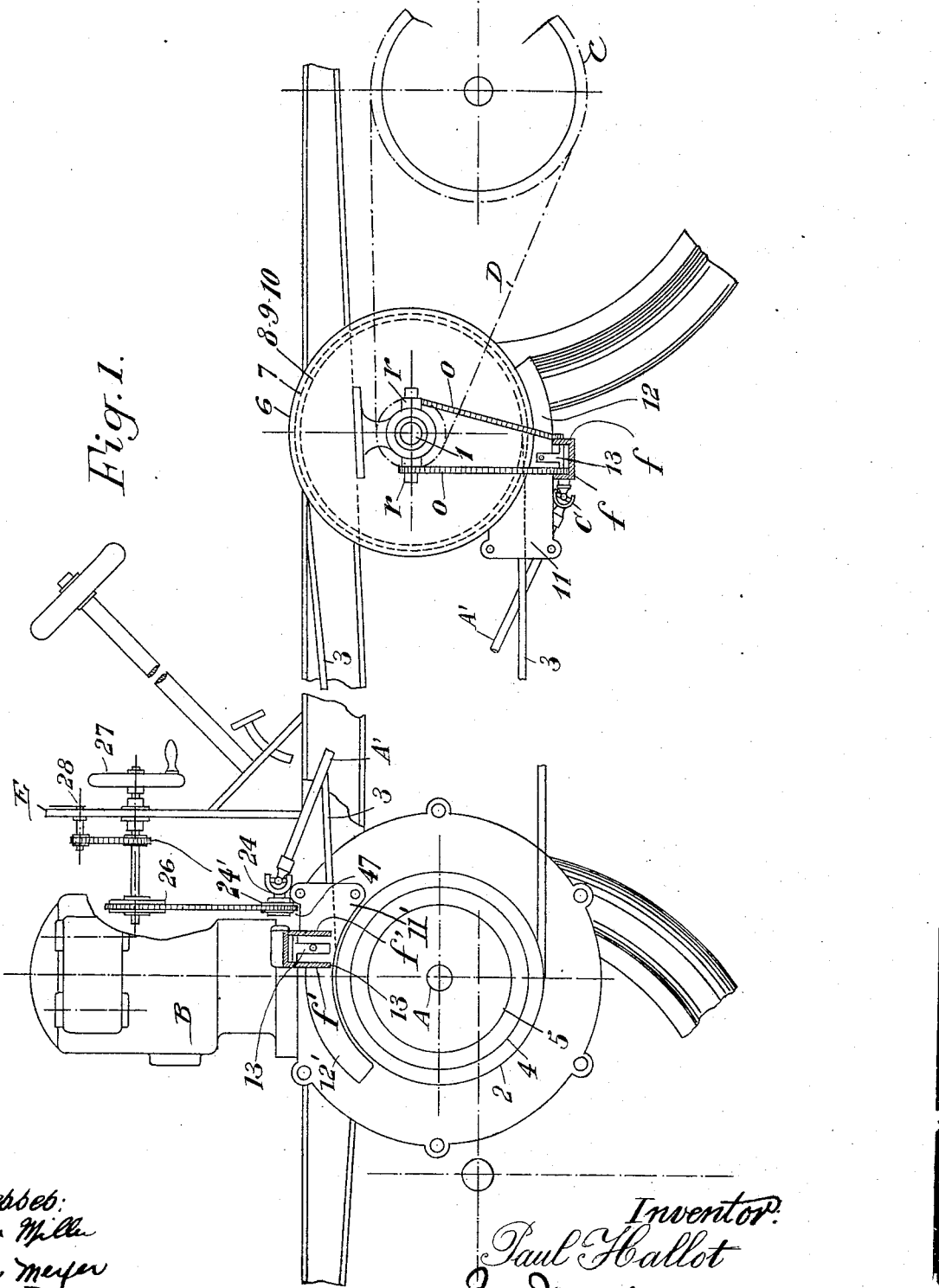

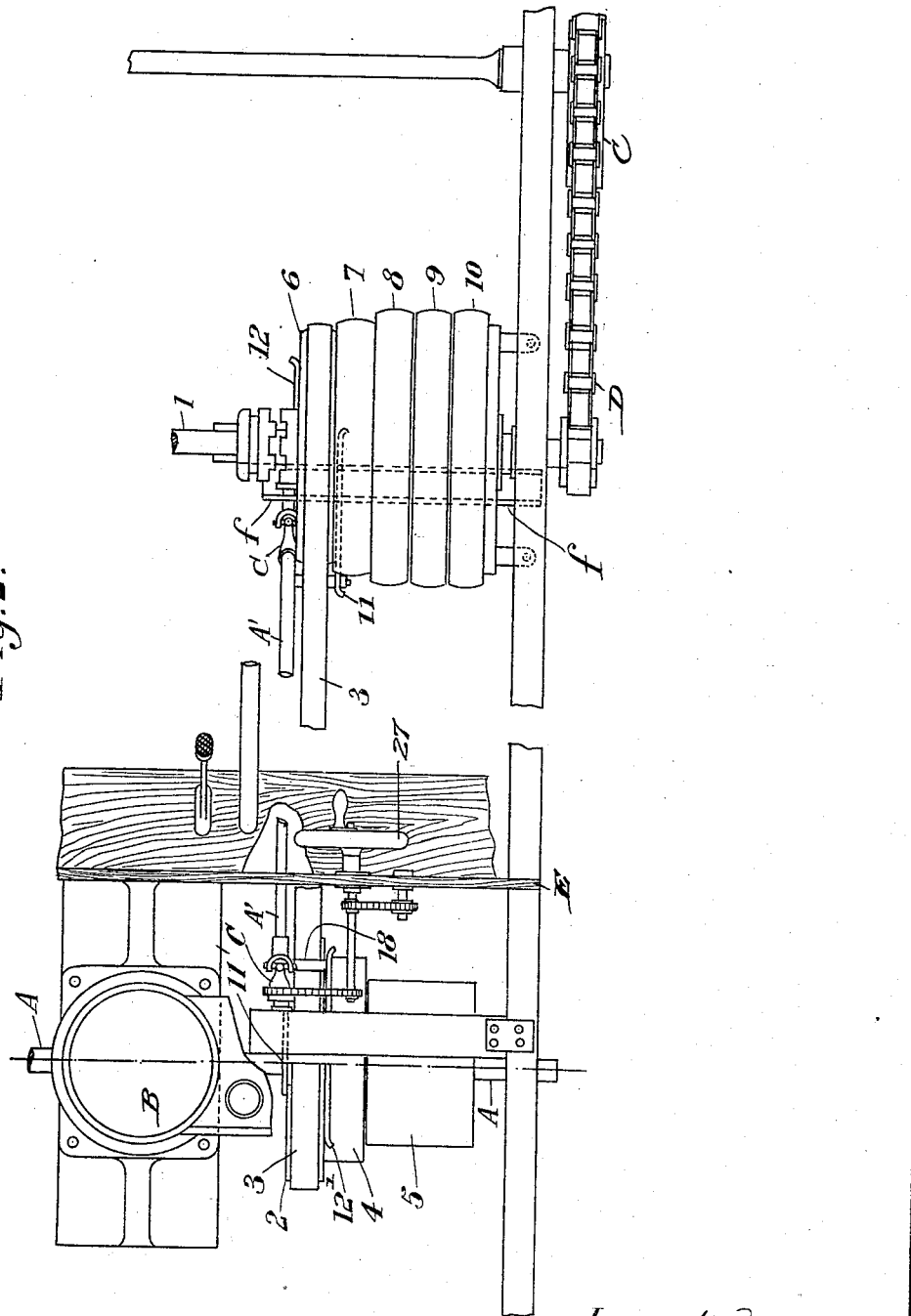

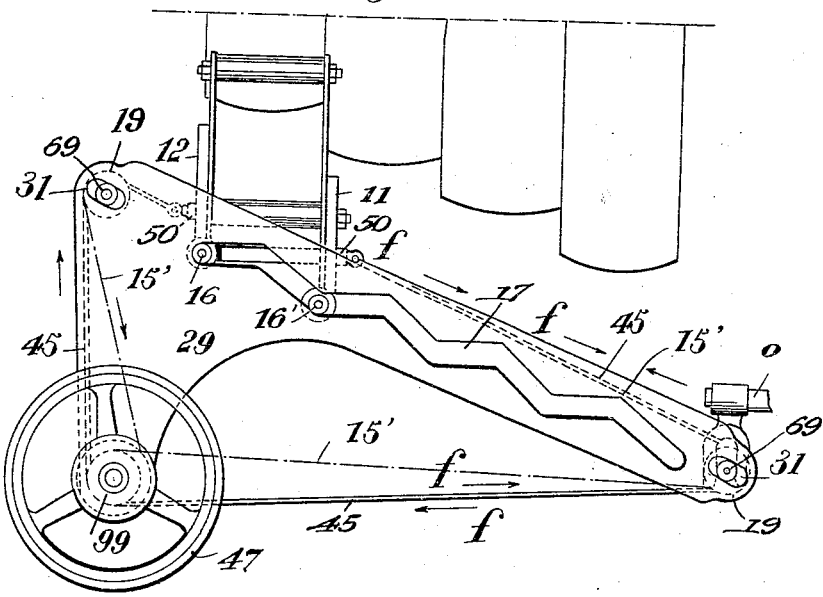
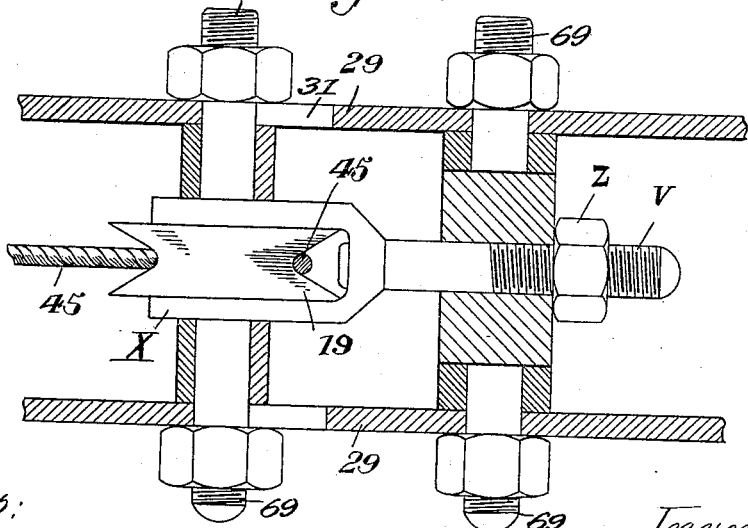

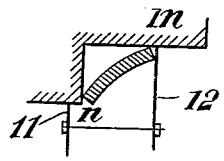
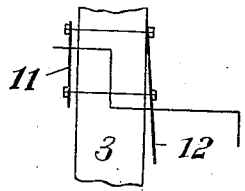
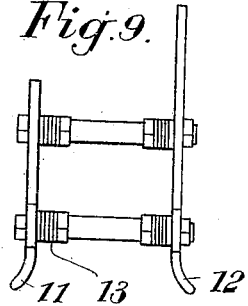
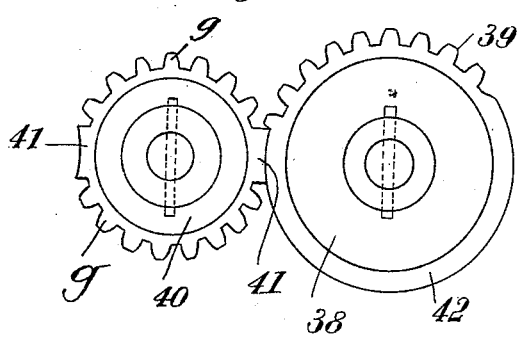
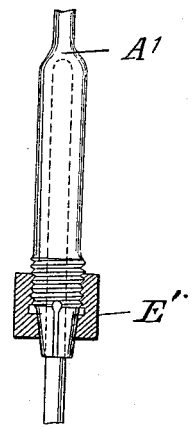
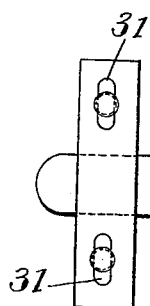

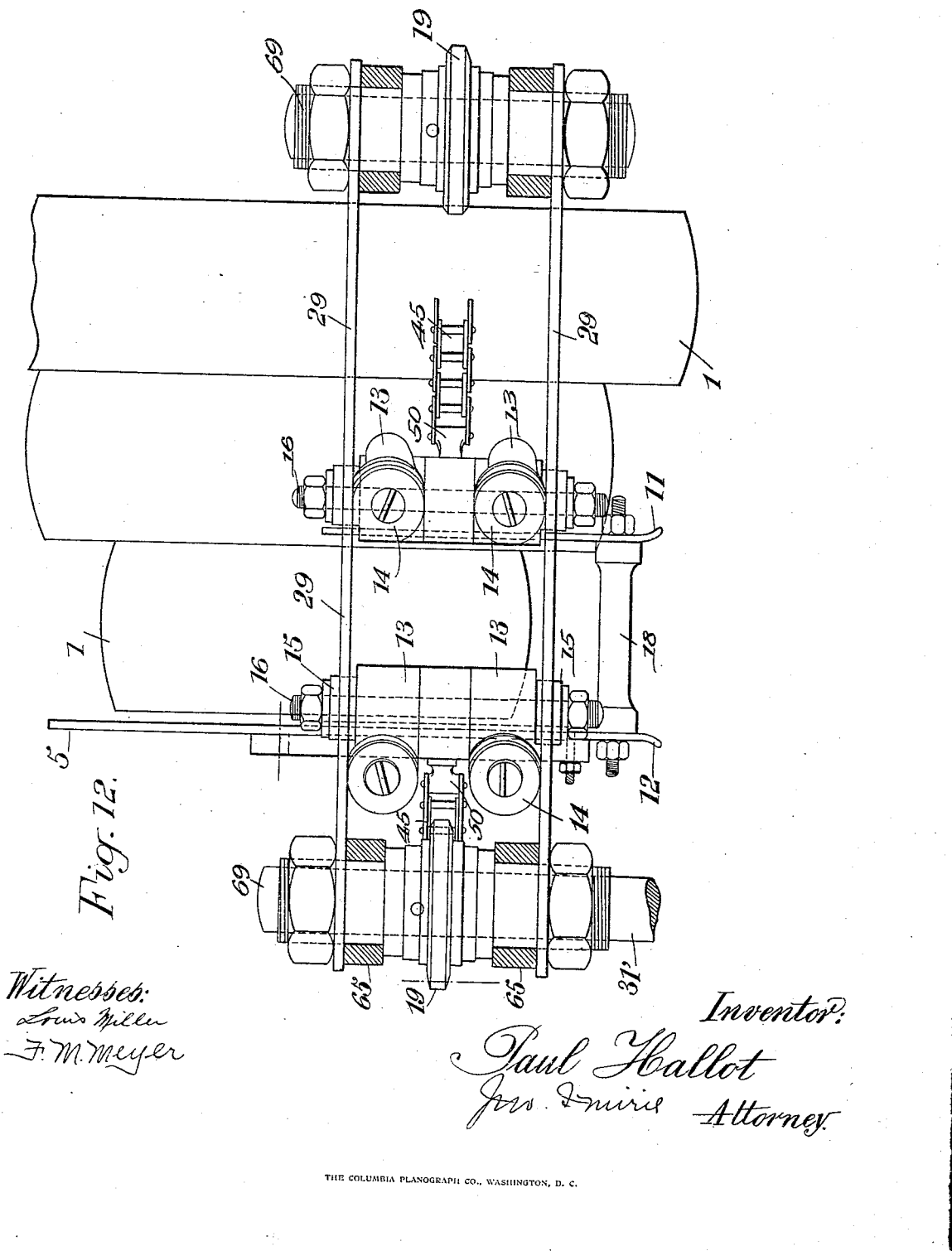

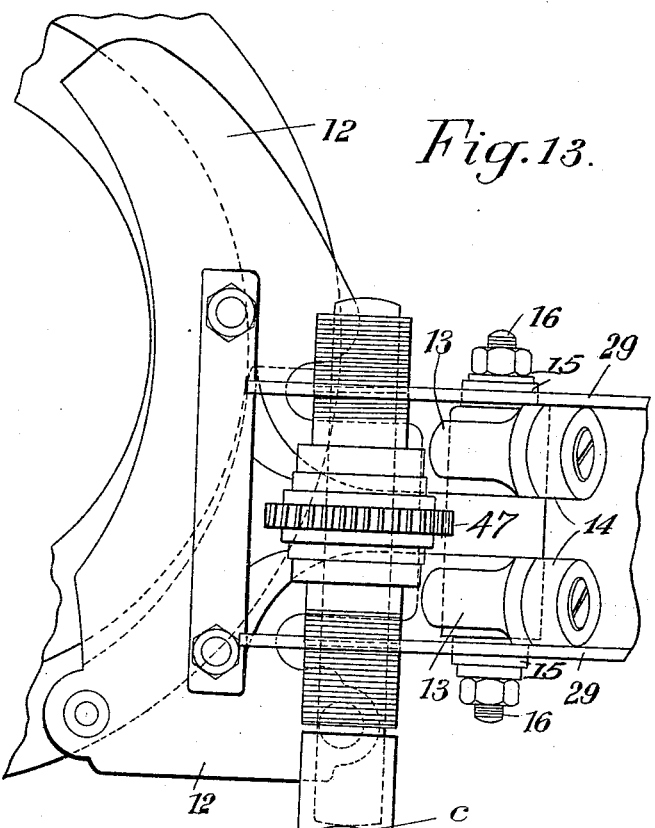
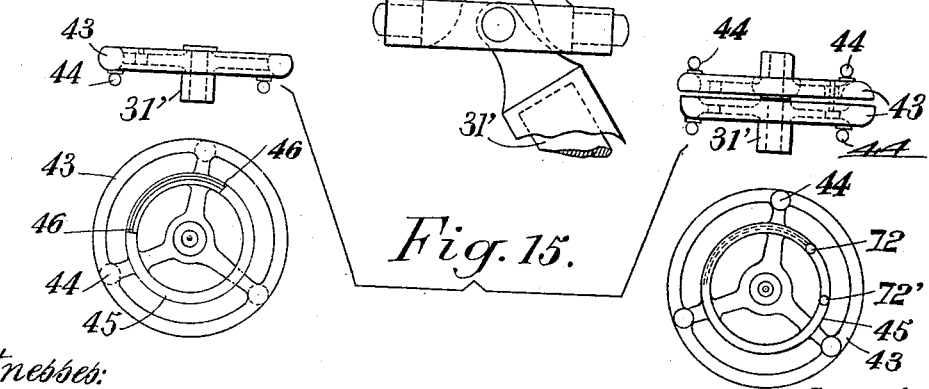

P. HALLOT.
SPEED CHANGE GEAR FOR MOTOR CARS AND OTHER PRACTICAL PURPOSES.
APPLICATION FILED MAR. 23, 1914.

1,189,100.

Patented June 27, 1916.
10 SHEETS—SHEET 8.

Fig. 14.

Witnesses:
Louis Miller
F. M. Meyer

Inventor:
Paul Hallot
Jos. Imirie Attorney

P. HALLOT.
SPEED CHANGE GEAR FOR MOTOR CARS AND OTHER PRACTICAL PURPOSES.
APPLICATION FILED MAR. 23, 1914.

1,189,100.

Patented June 27, 1916.
10 SHEETS—SHEET 9.

Witnesses:
Louis Miller
F. M. Meyer

Inventor:
Paul Hallot
Jas. Imirie Attorney

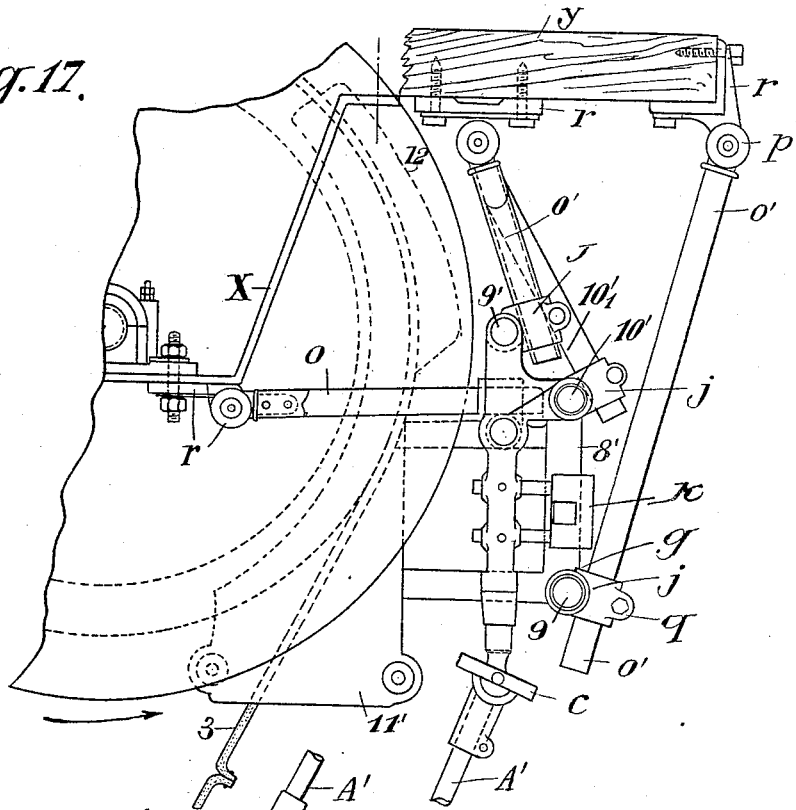
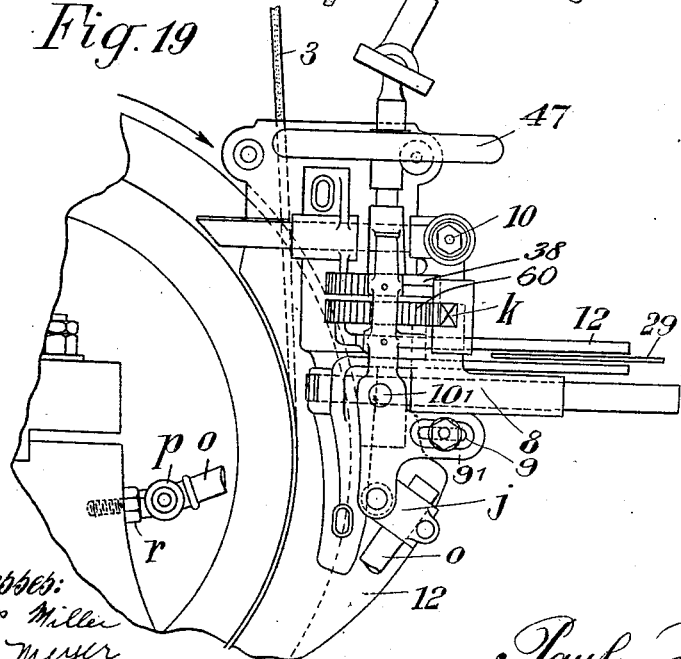

UNITED STATES PATENT OFFICE.

PAUL HALLOT, OF VERSAILLES, FRANCE.

SPEED-CHANGE GEAR FOR MOTOR-CARS AND OTHER PRACTICAL PURPOSES.

1,189,100.  Specification of Letters Patent.  Patented June 27, 1916.

Application filed March 23, 1914. Serial No. 826,750.

*To all whom it may concern:*

Be it known that I, PAUL HALLOT, a citizen of the French Republic, and resident of Versailles, France, have invented certain new and useful Improvements in Speed-Change Gears for Motor-Cars and other Practical Purposes, of which the following is a specification.

The object of the present invention is to provide a speed change gear intended to be used as a substitute for the usual toothed speed change gear of motorcars and which enables the same results to be produced in any machine-tool by producing through the agency of an apparatus applied to the machine, the shifting of the driving belts on all the stepped cones or pulleys for the purpose of producing the desired speed by means of a mechanical action obtained by a simple operating wheel placed in the reach of the operator.

The apparatus is essentially characterized by the fact that the driving belt is moved into the desired position by an appliance of two suitably arranged metal plates, the displacement of which may be produced at the desired moment and to the desired extent by means of pulling members or devices such as wire-cables or any other known mechanical means (worm rack and the like).

In the accompanying drawings: Figure 1 shows an apparatus mounted upon the chassis of a motorcar. Fig. 2 is a top plan view of Fig. 1. Fig. 3 is a sectional view of the operating wheel of the apparatus. Fig. 4 is a top plan view of Fig. 3. Fig. 5 shows the operating wheel of Fig. 3 in its operative position. Figs. 6 to 11 show several details of the apparatus intended to facilitate the comprehension of its operation. Figs. 12 to 20 illustrate modifications of the apparatus.

In Figs. 1 and 2 of the accompanying drawings I show my speed change gear as applied to motorcars. A represents the shaft of the engine B. On this shaft are mounted the pulleys 2 and 4, and the drum 5. On the shaft 1, mounted to the rear of engine B and connected to the drive-wheel C by sprockets and chain, or any other suitable means D, are mounted the pulleys 6, 7, 8, 9 and 10 of various diameters and either free to rotate upon or mounted to rotate with shaft 1. In this particular instance pulley 9 is free to rotate upon the axis 1 and serves to stop the car. Pulley 8 is mounted to rotate with shaft 1 and give the car motion, as are pulleys 6 and 7. Pulley 10 is so mounted as to give the car a backward motion when the pulley is rotated. A belt 3 serves to connect the pulleys 2, 4, and drum 5 with the pulleys 6, 7, 8, 9 and 10 and thereby transmit the power from the engine B to the drive wheel C. The belt 3 is shifted from the variously sized pulleys, 6, 7, 8, 9 and 10 and 2, 4 and 5 to change the direction, power or speed of the motorcar by the following means: Two parallel and vertical plates 11 and 12 spaced a distance apart approximately equal to the width of the belt used, are mounted laterally movable upon suitable guides $f$, supported by rods fastened by suitable means $r$—$r$. Upon the dash board E I show a wheel, 27 connected by means of suitable sprockets 24′, 26 and 28 and chains to a gear wheel 24 which rotates a shaft A′ connected to a universal joint at gear 24 and another such joint connecting the shaft A′ to the means for laterally moving the belt shifting plates 11 and 12. Gear 24 is also connected to two belt shifting plates 11′ and 12′ similar in every way to plates 11 and 12 except in position with respect to the pulleys 2 and 4 and drum 5. The plates in this instance are mounted laterally movable at the upper rims of the pulleys upon the guides $f'$.

The vertical belt shifting plates 11 and 12, and 11′ and 12′ are fastened together, parallel and vertical, a distance apart approximately equal to the width of belt used. Two guide plates 29—29 (Figs. 5, 12, 20) parallel and horizontal are fastened across the lower front of the rear set of pulleys and the upper rear of the set of pulleys upon the engine shaft A. These plates 29—29 have guides 17 cut through them of the exact profile of the set of stepped pulleys before which they are fastened. The belt shifting plates are held the required distance apart by the bolt 18, and at their rear ends are fastened the vertical shafts 16—16. These shafts carry four rollers, designated by the numeral 15, one roller placed at each end of each shaft and arranged in the guides 17 which are cut in the plates 29. These shafts 16 bearing the plates 11, 12 and the rollers 15, are laterally movable in the guides 17 and as the shafts 16 are moved in the guides they move the belt shifting plates 11, 12 which carry the belt 3, thus shifting the position of the belt on the stepped pulleys. The vertical shafts 16 also have the shafts or roller bearing holders 13 fastened to the shafts 16 and plates 11 and 12. These shafts 13 are at right angles to the shafts 16 and also at an angle of 90° to the longitudinal center of the plates 29. Each of the shafts 16 has two shafts 13 carrying rollers 14 at their ends. These shafts 13 are at a distance apart so that the rollers 14 of the upper shafts 13 will bear on the under side of the upper plate 29, and the rollers 14 of the lower shafts 13 will bear on the upper side of the lower plate 29. The foregoing description covers the belt shifting carriage and is a description of both the carriage bearing the belt shifting plates 11 and 12 at the set of pulleys on shaft 1, and the carriage bearing the belt shifting plates 11' and 12' at the set of pulleys on shaft A. This carriage, due to the fact that every bearing surface is provided with rollers thereby reducing friction to the minimum, is exceedingly smooth running and laterally movable in the guides and the guide plates by expending the smallest possible amount of effort or power.

Referring to Figs. 5 and 6, in Fig. 6 I show more or less diagrammatically, the belt shifting plates 11 and 12, the belt 3 and one step in the series of stepped pulleys. I show in Fig. 5 the completed device for laterally moving the belt shifting plates and carriage and it is the guides or grooves 17 in this figure to which I now wish to call particular attention. It will be clearly seen in Fig. 6 that in moving belt 3 from one pulley to another that either plate 11 or plate 12 merely moves through a distance equal to half the distance the belt moves through. Now referring to Fig. 5 where I clearly show guides or grooves 17, these guides are so traced that the sections parallel to the faces of the pulleys are equal to half the width of the pulleys and these sections start at the left hand side of the pulley, facing the pulleys from the plates 29 and run to the right half way the width of the pulley. The plates 11 and 12 are so fastened, with respect to each other, that the plate on the right, as you face the pulleys from the plate 29, is set farther from the faces of these pulleys, and its rear end projects past the rear end of the other plate. Therefore the parallel sections of the guides 17 are each, starting at the left, a distance away from each other in a direction from the faces of the pulleys, equal to this difference between the ends of the plates 11 and 12 and a distance away from each other to the right equal to half the width of the face of the pulley in front of which they are located. Thus it will be seen that in moving the belt shifting carriage to shift the belt through one step, the carriage moves parallel to the axis of the pulleys for half the distance of the width of the pulley it faces, then moves at an angle from this axis and toward the next pulley thereby pushing the belt over and out of the desired pulley.

Fig. 7 shows the belt shifting plates 11 and 12 during the operation of shifting the belt from one pulley to another and is a diagrammatic figure. In this figure the upper portion of the larger plate is shown inclined forward, the belt at a sufficient angle to give a constant tension against the free end of the belt to facilitate its movement from one pulley to another.

Fig. 9 is merely a disclosure of the fastening together of the plates 11 and 12.

Figure 16:
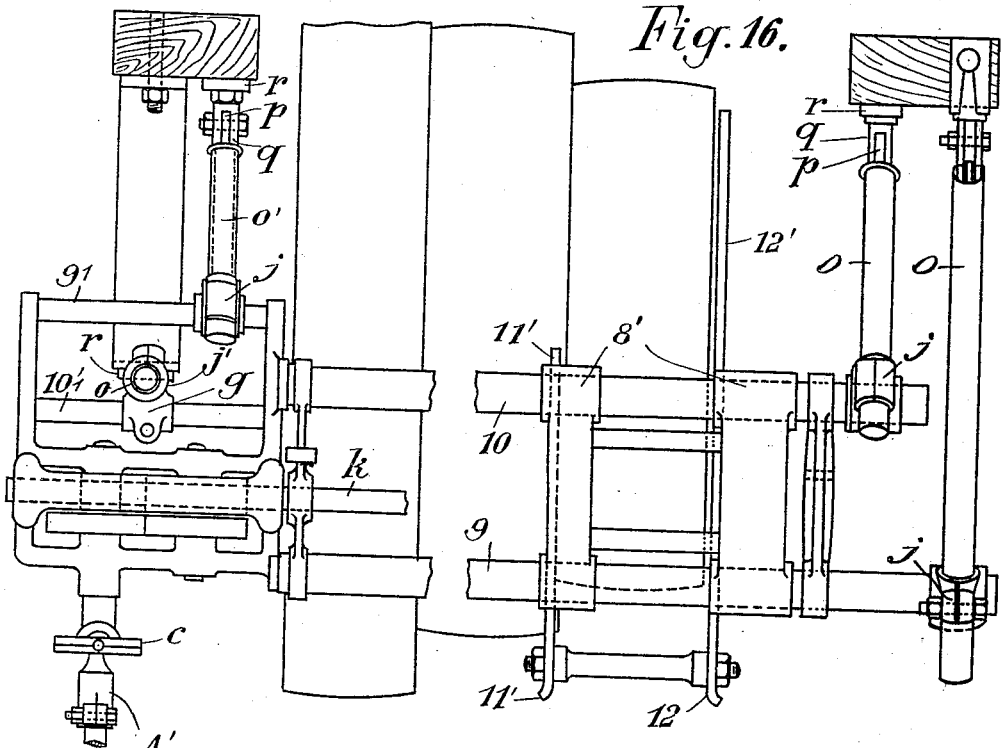

With regard to the means for laterally moving the belt shifting carriage and plates, I call particular attention to Figs. 5, 20, 12, 13 and 14. The plates 29—29 are held the required distance apart by bolts or shafts 69 upon which are horizontally mounted the pulleys or sprockets 19. These bolts 69 are fastened at the opposite ends of the plates 29. In the same plane with the pulleys or sprockets 19 is the operating wheel 47 having a sprocket or pulley 19 mounted on its shaft. The three pulleys 19 fixed between the plates 29 form the vertices of a right angle triangle in which the wheel and shaft 47 are at the right angled vertex. Around these three pulleys or sprockets is stretched a cable or chain 45 whose ends are fastened to the sides of the belt shifting carriage by bolts or any suitable means 50. Now it will be seen that by rotating the wheel 47 the cable or chain 50 is moved as an endless cable or chain, and the belt shifting carriage, being the connecting link in this endless cable or chain, is likewise moved in whatever direction the wheel 47 is rotated, and as a result the belt 3 is grasped by the shifting plates 11 and 12 and carried by the moving carriage and shifted from one pulley to another. The desired pulley is selected by the operator.

In Fig. 20, I show a method for tightening or loosening the cable or chain 45 by moving the pulleys or sprockets 19. A winged bolt V having a threaded end on which is screwed a nut Z is mounted slidably between the plates 29. The winged portion X fits over the pulley or sprocket 19 and is fastened to the shaft or bolt 69. Slots 31 are cut in the plates 29 in which are the shafts 69. When the cable or chain 45 needs tightening, the nut Z is turned on the bolt V to the right thereby drawing the shaft 69 carrying the pulley or sprocket 19 outwardly in the slot 31 and the slack is taken up in the cable or chain 45. To loosen 45 the operation described above is reversed.

Referring to Figs. 8 and 10, of the drawings, the guide plate 29 has its ends provided with slots 31 to enable a more perfect adjustment of its position with respect to the series of pulleys in which it is placed. I also call attention to the recesses N in the guide slots 17 which enable the roller bearings of the belt shifting carriage to rest therein when in position before a pulley thus having a steadying action as well as allowing a small radial movement of the carriage. Fig. 10 shows the guide plate 29 having guides or slots 17 cut for use in combination with the set of pulleys 2, 4 and 5 mounted on the engine shaft A. Now when it is desired to move the belt shifting carriages intermittently, they are connected with a set of gear wheels such as 38 and 40, of Fig. 8, which in turn are operated by suitable hand power means. Wheel 38 has the toothed portion 39 and the wheel 40 has two toothed portions $g$, each of the same arc length as the toothed portion 39 of wheel 38. These toothed portions $g$ have two flat sections 41 separating them. These wheels with their flat and toothed portions are so proportioned that a complete revolution of the hand operated wheel, such as wheel 47 shown in some of the figures, will move the belt shifting carriage such as $n'$ and $n^2$, Fig. 10 in the guides 17, which will at the same time cause the belt to be shifted from one pulley to the one next to it in the series of stepped pulleys. This result is obtained because of the fact that when the wheel 38 is rotated and the toothed portion 39 engages with one of the toothed portions $g$ of the wheel 40, it rotates the wheel 40 until it reaches the flat surface 41, when because of the construction of the wheel 38, its flat section 42, comes in contact with said flat section 41 of the wheel 40 and the rotation of the wheel 38 ceases until the toothed section rotates around into contact with the other toothed section when the wheel 40 again rotates until the other flat section 42 of the wheel 38 when rotation of the wheel 40 again ceases. Each rotation of wheel 40 through the distance of one of its toothed sections causes the belt to be shifted one step in the series of stepped pulleys. This movement or shifting of the belt is operated by the means hereinbefore described when connected to the rotating wheels 38 and 40.

When an alternate movement of the belt shifting carriages is desired, a clevice shown in Figs. 3 and 4 is coupled into the operating gearing for shifting said carriages. A wheel 47 is mounted to rotate upon an eccentric disk 22 fixed upon the shaft 23 by a screw $h$. Mounted to rotate with the shaft 23 are the two clutch disks 24. Each disk 24 has a lug $a'$ on its inner face near its outer edge. The wheel 47 has two lugs 25 projecting from opposite faces on each side of its center. The lugs $a'$ and 25 are preferably triangular in form as shown in the Figs. 3 and 4. These lugs are so located that when the wheel 47 is rotated due to the eccentric disk 22, its lugs will alternately engage the lugs of the two clutch disks and give the drums 24 alternate rotation. These drums are connected to the drums 19 between the plates 29, and a resulting alternate movement of the belt shifting carriages results from rotating the wheel 47.

Fig. 11 shows a means for adjusting the shaft $A'$ which connects the operating means with the belt shifting means. A tapering nut $E'$ is placed in a break in the shaft $A'$ enabling the shaft to be lengthened or shortened by moving the nut $E'$ thus drawing the two sections of the shaft $A'$ forward or away from each other according to the direction of movement of the nut $E'$ as necessitated by the needs of the length of shaft $A'$. This also allows the operating and belt shifting means to be disconnected if so desired for repairs to the belt and the like.

Fig. 15 shows a modification which allows of the alternate operation of the two means by the two wheels 43 arranged parallel to each other and their axis in the same straight line. These wheels 43 are connected to separate the shafts and have connecting pins 44 in their outer rims. They also have the solid sectors 45 having the grooves 46 cut in their center and the pins 72 and 72' resting in said grooves.

Another form of my invention, as applied to transmission, is shown in Figs. 16 and 17, of which the following is a description. The belt shifting plates 11' and 12 are mounted upon the carriage 8', which in turn is mounted for sliding movement upon the horizontal tubes 9 and 10, which are supported at the left by a carriage and at the right by tubes $o$—$o$, which tubes are supplied for the purpose specified with collars $j$—$j$. The carriage for supporting the tubes 9—10, is in turn supported by tubes $o'$, which tubes are provided for the purpose specified with collars $j$. The tubes $o$ and $o'$ are further provided with ears $p$, which are held in a bifurcated portion $q$, of a bracket $r$. The operating shaft $A'$ having a universal joint $c$, is connected by the necessary means to a rack which is in turn joined to the above mentioned carriage. Now, a rotation of the shaft $A'$ will, by the means supplied, which are connected to the rack, move said rack, and in turn move the carriage and the belt shifting plates 11' and 12, and thereby shift the belt controlled by said plates.

Figure 18:
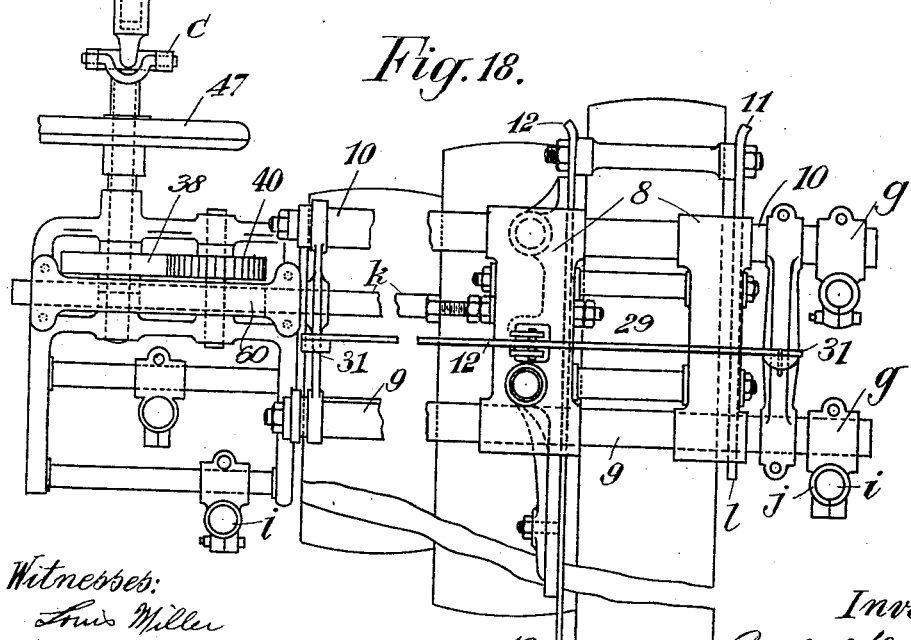

In Figs. 18 and 19, I show my invention applied to a machine tool and the description preceding will clearly apply to this form without it being necessary for repetition, although in Figs. 18 and 19 I show gears 38 and 40 described from Fig. 8 of the drawings in connection with the gear 60 which drives the rack K.

Now from the foregoing explanations of my invention, it may be seen that the application is not limited to motor car transmissions, but may be applied to any machine, tool or the like device and form a practical, simple, and efficient speed change gear. This system may be applied in general to any moving pulleys and the methods for fastening and adjusting said system enables it to be applied to machines of the class mentioned whether vertical or horizontal.

Having thus fully described my invention what I claim and desire to secure by Letters Patent is:

1. In a speed change gear, the combination with two series of stepped pulleys, a belt connecting said pulleys, of means for shifting said belt comprising belt engaging fingers, a carriage supporting said fingers, a pair of plates for guiding the movement of the carriage, said plate having a profile coincident with the profile of the stepped pulleys.

2. In a speed change gear, the combination with two series of stepped pulleys, a belt connecting said pulleys, of belt shifting means comprising belt engaging fingers, a carriage for supporting the fingers, a pair of spaced plates provided with a profile slot of a conformation coincident with the profile of the pulleys, rollers on the carriage adapted to engage the profile slot, and means for moving the carriage whereby the carriage will describe the path coincident with the outline of the pulleys.

3. In a speed change gear, the combination with two series of stepped pulleys, a belt connecting said pulleys, of belt shifting means comprising belt engaging fingers disposed adjacent each series of pulleys, a carriage for supporting each pair of fingers, pairs of spaced plates for guiding the movement of each carriage, said plates being provided with a profile slot, means for moving the carriage along the slot, means for connecting said carriage moving means, and means for operating each carriage moving means alternately.

4. A belt shifter for stepped pulleys comprising fingers adapted to engage opposite edges of the belt, one of said fingers being longer than the other, a carriage for supporting the fingers, a pair of spaced plates forming a guide for the carriage, said plates being provided with a profile slot cut in conformation to the profile of the stepped pulleys, and means for moving the carriage.

5. A belt shifter for stepped pulleys comprising fingers for engaging opposite edges of the belt, one of said fingers being longer than the other, a carriage for supporting the fingers, a pair of triangular spaced plates, said plates having a profile slot cut in conformation to the profile of the pulleys, rollers on the carriage adapted to engage the profile slots, pulleys mounted in the corners of the triangular plate, a flexible band disposed around the pulleys and having its ends connected to the carriage, and means for rotating one of the pulleys, whereby the carriage will be moved along the profile slot.

6. In a speed change gear, the combination with two series of stepped pulleys, a belt connecting the said pulleys, of means for shifting said belt on each series of pulleys, and operating means for alternately moving the belt shifting means consisting of a wheel carrying lugs, an opposite face mounted eccentrically upon a shaft, two disks on opposite sides of said wheel and connected to each of the belt shifting means, said disks having lugs for alternate engagement and rotation by the lugs on said eccentrically mounted wheel.

7. In a speed change gear, the combination with two series of stepped pulleys, a belt connecting said pulleys, of means for shifting the said belt comprising two vertical and parallel plates, said belt engaged by the said plates, a carriage supporting said plates and laterally movable across the series of stepped pulleys, said carriage mounted on roller bearings, horizontal and parallel guide plates adjacent the pulleys, said guide plates having grooves of the form of the profile of the said stepped pulleys, said carriage laterally slidable in said grooves and on said guide plates, and operating means for said carriage and belt shifting plates.

8. In a speed gear, the combination with two series of stepped pulleys, a belt connecting said pulleys, means for shifting said belt comprising two vertical and parallel plates, said belt engaged by said plates, a carriage supporting said plates and laterally movable across the series of stepped pulleys, said carriage mounted on roller bearings, horizontal and parallel triangular guide plates fastened adjacent said pulleys, said guide plates having grooves of the form of the profile of said stepped pulleys, said carriage laterally slidable in said grooves and on said guide plates, and operating means for said carriage and belt shifting plates consisting of vertical shafts at the three vertices of the triangular guide plates, sprockets mounted on said shafts, a chain passing over the three sprockets and fastened at its ends to the belt shifting carriage, and a hand wheel for rotating said sprockets and chain, and laterally moving said belt shifting carriage, and plates mounted on the shaft at the right angled vertex of said horizontal plates.

9. In a speed change gear, the combination with two series of stepped pulleys, a belt connecting said series of pulleys, of means for shifting said belt consisting of a carriage, plates, said belt engaged by said plates, guide plates having stepped grooves cut therein of the profile of the series of stepped pulleys before which they are placed, said guide plates having the carriage retaining rests at intervals in the stepped grooves, and means for operating said carriage and plates.

10. The combination with a pair of stepped pulleys, of a pair of substantially triangular plates located adjacent each stepped pulley, said plates being provided with a profile slot cut in conformation to the profile of the stepped pulleys, a belt shifter located between each pair of plates, a carriage for supporting each set of belt engaging fingers, rollers on the carriages which are adapted to engage the profile slots, sprockets located in the corners of the triangular plates, a chain which is connected to the carriage and passes around the sprockets, a universal joint connected to one of the pulleys in each pair of triangular plates, a shaft which connects the said flexible joints, and means on each pair of plates for suspending or connecting the same to any suitable support.

11. The combination with a stepped pulley, of a belt shifter which comprises a pair of substantially triangular plates which are provided with a profile slot cut in conformation to the profile of the stepped pulley, a belt shifting carriage mounted for movement between the plates, said carriage comprising a pair of vertically extending arms, a bolt for rigidly connecting together the arms, a finger mounted on the end of each arm, one of which is longer than the other and which are adapted to engage opposite edges of a belt, a plurality of rollers mounted on the lower end of the carriage for engagement with the profile slot, and a second set of rollers mounted on the lower portion of the carriage and which are adapted to afford rolling engagement with the inner sides of the plates for the purpose of reducing friction.

12. The combination with a stepped pulley, of a belt shifter which comprises a pair of substantially triangular plates spaced from each other, each of said plates being provided with a profile slot, a carriage mounted for movement between the plates and having rollers for engagement in the slot, a sprocket mounted in each corner of the triangular plates, a shaft to which the sprocket is keyed, collars surrounding the shaft and engaging opposite sides of the sprockets for the purpose of spacing the plates away from the sprockets, and jam nuts having threaded engagement with the shaft and which are adapted to bear against the outside surfaces of the plates, and a flexible chain which is connected to the carriage and which is adapted to pass around the pulleys.

In testimony whereof I have hereunto set my hand in presence of two witnesses.

PAUL HALLOT.

Witnesses:
 CHAS. P. PRESSLY,
 GASTON PETION.

Copies of this patent may be obtained for five cents each, by addressing the "Commissioner of Patents, Washington, D. C."